Sept. 20, 1966  R. R. MAHEU  3,274,394
ALTERNATOR MOUNTING ASSEMBLY FOR VEHICLES
Filed July 24, 1964  2 Sheets-Sheet 1

Roland R. Maheu
INVENTOR

BY *Clarence A. O'Brien*
and *Harvey B. Jacobson*
Attorneys

Roland R. Maheu
INVENTOR

United States Patent Office 3,274,394
Patented Sept. 20, 1966

3,274,394
ALTERNATOR MOUNTING ASSEMBLY
FOR VEHICLES
Roland R. Maheu, Minot, Maine
(767 Minot Ave., Auburn, Maine)
Filed July 24, 1964, Ser. No. 384,979
4 Claims. (Cl. 290—1)

This invention relates to a novel and useful alternator mounting assembly and more specifically to an alternator mounting assembly primarily designed for the purpose of enabling a supplemental alternator to be operatively mounted on the engine of a Volkswagen vehicle.

Although the alternator mounting assembly of the instant invention could be utilized in converting the electrical system of a Volkswagen vehicle from six volts to twelve volts, its primary purpose is to provide a means whereby an additional twelve volt electrical system may be applied to a Volkswagen vehicle, the twelve volt electrical system being utilized to power special accessories such as two-way radios and telephones.

Inasmuch as the wiring, ignition and lighting systems of Volkswagen vehicles are designed for six volt operation, conversion of the entire electrical system of a Volkswagen to a twelve volt system would be very expensive. While it is possible that a heavy duty six volt alternator could be utilized in lieu of the conventional six volt generator now supplied with Volkswagen vehicles, twelve volt alternators are much more readily available than six volt alternators and are therefore less expensive to purchase. In addition, although a single heavy duty six volt alternator could be utilized to provide a sufficient source of electrical energy to not only service the electrical system of a Volkswagen vehicle but also electrical systems of special electrical accessories requiring large amounts of electricity, a single six volt alternator would obviously not supply the same amount of electrical potential as the conventional six volt generator in addition to a twelve volt alternator. Accordingly, it is the main object of this invention to provide an alternator mounting assembly for Volkswagen vehicles specifically designed to provide a means whereby a 12-volt alternator may be operatively mounted on and for driving from a Volkswagen engine.

Another object of this invention, in accordance with the preceding object, is to provide a complete supplemental electrical system for a Volkswagen vehicle including a conventional 12-volt alternator, the mounting bracket therefor and other hardware and accessories facilitating the complete installation of a supplemental 12-volt electrical system in a Volkswagen vehicle.

Yet another object of this invention is to provide an alternator mounting assembly for Volkwagen vehicles including structural components designed to mount the supplemental alternator of the assembly for driving from the associated internal combustion engine and in an unobtrusive position whereby normal periodic preventative maintenance may be readily performed on the internal combustion engine without interference from the alternator mounting assembly of the instant invention.

Another object of this invention is to provide an alternator mounting assembly including structural components for mounting an alternator in an operative position on a Volkswagen engine that may be readily installed without the use of special tools by means of a non-skilled mechanic.

A final object of this invention to be specifically enumerated herein is to provide an alternator mounting assembly of Volkswagen vehicles in accordance with the preceding objects which will conform to conventional forms of manufacture, be of simple construction and easy to install so as to provide a device that will be economically feasible, long-lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
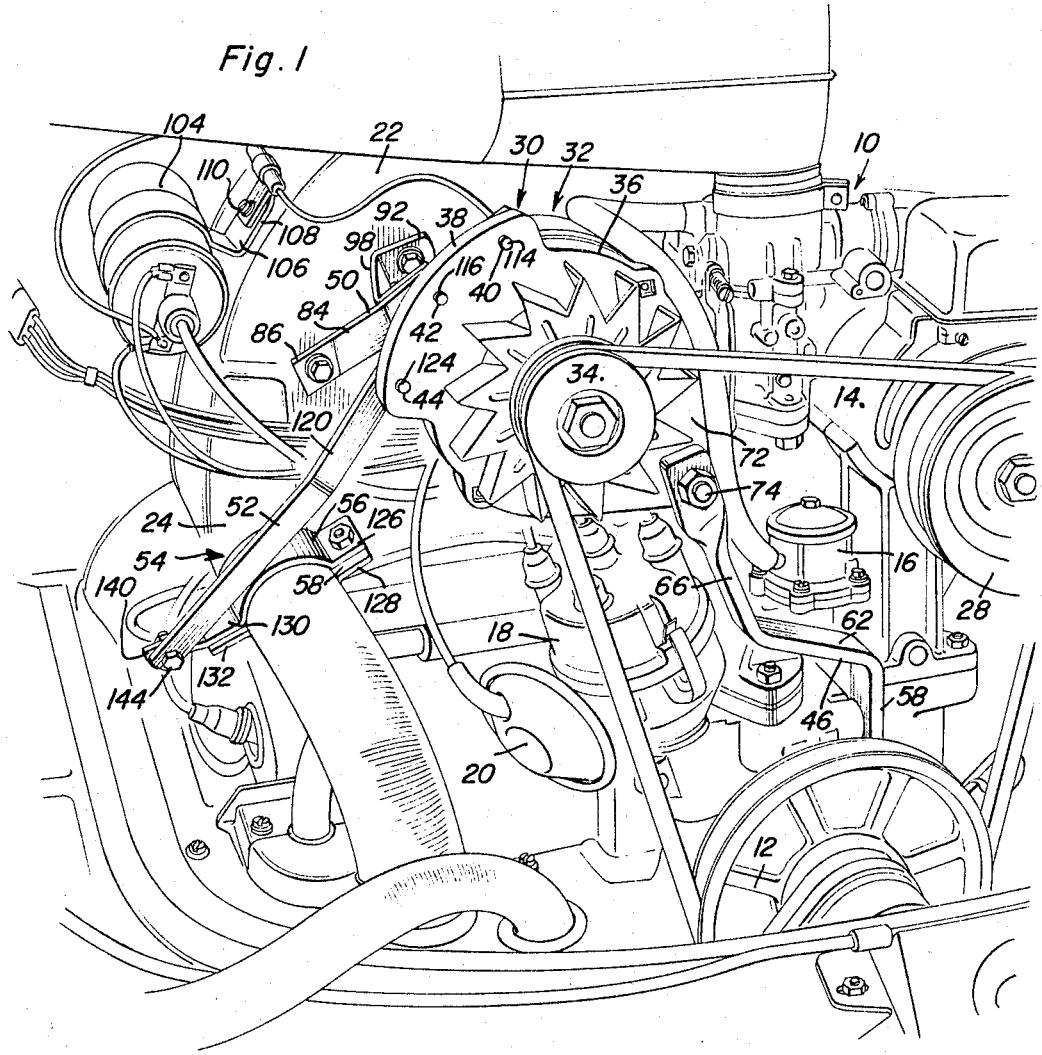
FIGURE 1 is a fragmentary perspective view of the engine compartment of a conventional Volkswagen vehicle shown with the alternator mounting assembly of the instant invention operatively mounted on the Volkswagen engine.

Referring now more specifically to the drawings the numeral 10 generally designates a conventional Volkswagen internal combustion engine including a crankshaft pulley 12, a generator 14, a fuel pump 16, an ignition distributor 18 including a vacuum advance 20, a fan shroud 22 including a heater air duct 24, and a crankcase assembly 26.

The generator 14 includes a drive pulley 28 which is aligned with the crankshaft pulley 12 and is usually driven therefrom by means of a belt entrained about the pulleys 12 and 28.

The alternator mounting assembly of the instant invention includes all of the components necessary for adding a supplemental 12-volt electrical system to the Volkswagen engine 10 and is generally referred to by the reference numeral 30. The assembly 30 includes a 12-volt alternator generally referred to by the reference numeral 32 including a drive pulley 34 and a generally cylindrical mounting case 36 including a radial mounting flange 38 having a plurality of threaded apertures 40, 42 and 44 formed therein.

Although the assembly 30 includes many minor components and accessories such as suitable wiring, a volt meter, a 12-volt battery, a 6-volt spark suppressor for the 6-volt generator 14, a replacement vacuum line, a replacement fuel line, and a 12-volt voltage regulator for the alternator 32, these additional components (not shown) are conventional and it is to be understood that they would be operatively connected to the associated components of the assembly 32 and the engine 10 in a conventional manner.

The mounting assembly 30 includes a plurality of mounting brackets 46, 48, 50 and 52 together with a clamp assembly generally referred to by the reference numeral 54 and including two clamp sections 56 and 58.

Figure 3:
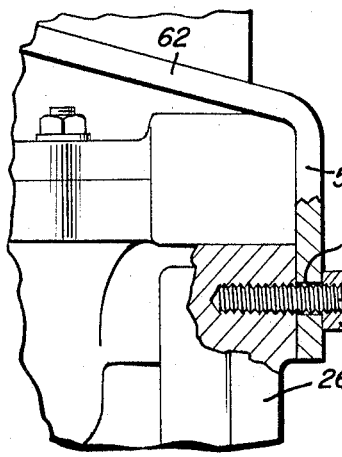
FIGURE 3 is a fragmentary rear end elevational view of a portion of a Volkswagen engine showing the manner in which one of the mounting brackets of the mounting assembly of the instant invention is secured thereto.
Figure 4:
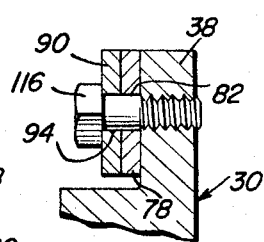
FIGURE 4 is an enlarged fragmentary sectional view taken substantially upon the plane indicated by the section line 4—4 of FIGURE 2.
Figure 5:
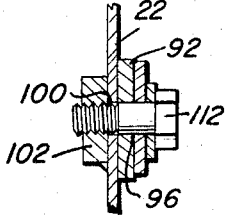
FIGURE 5 is a fragmentary enlarged sectional view taken substantially upon a plane designated by the section line 5—5 of FIGURE 2.

The mounting bracket 46 is generally L-shaped in configuration and includes a short leg 58 which is apertured as at 60 and a long leg 62 disposed at right angles to the short leg 58 and including a laterally directed end portion 66 whose terminal end portion 68 is rotated 180 degrees and provided with an aperture 70. The short leg 58 is secured to the crankcase 26 by means of a threaded stud 72 and a threaded fastener 72 engaged with the stud 72 in a conventional manner as shown in FIGURE 3 of the drawings and the terminal end portion 68 of the mounting bracket 46 is secured to a second mounting flange 73 carried by the case 36 and disposed diametrically opposite the mounting flange 38. A suitable fastener 74 is secured through an appropriate aperture (not shown) formed in the mounting flange 72 and the aperture 70 formed in the terminal end portion 68. The mounting bracket 50 is also generally L-shaped in configuration including a short leg 78 which is suitably apertured as at 80 and 82 and a long leg 84 including a laterally directed terminal end portion 86 which is suitably apertured as at 88. The mounting bracket 48 is generally U-shaped in configuration including a pair of generally parallel legs 90 and 92 suitably apertured as at 94 and 96, respectively, and interconnected at one pair of corresponding ends by means of an integral bight portion 98.

Figure 2:
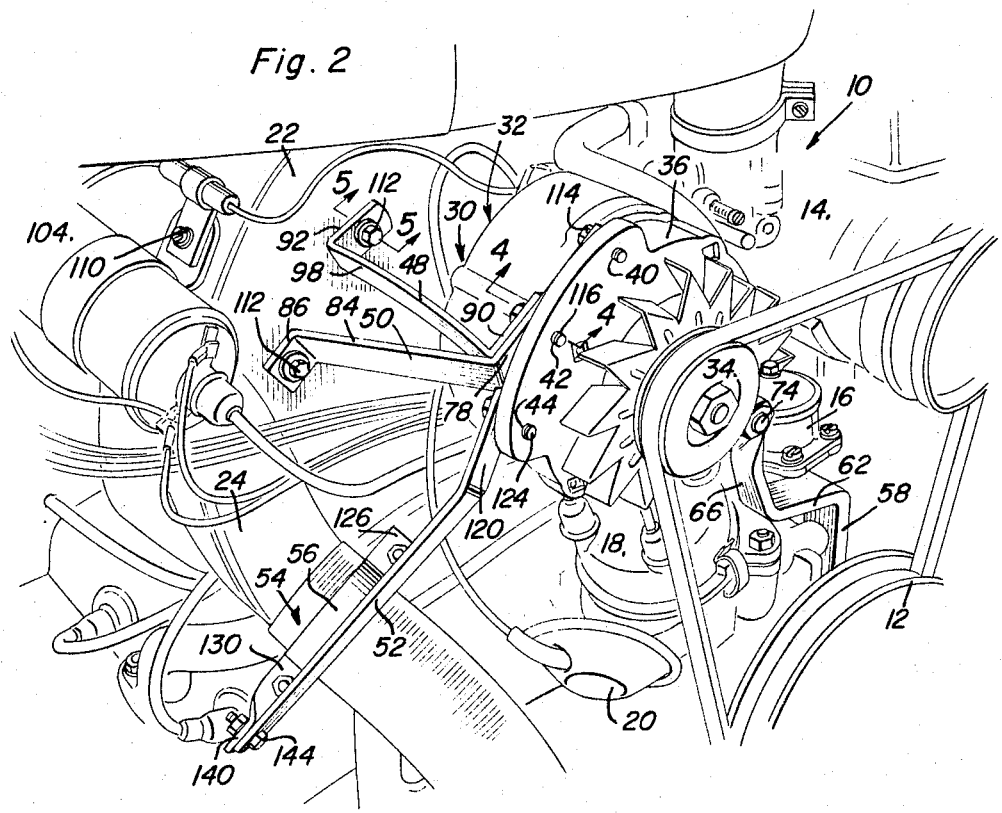
FIGURE 2 is a further perspective view of the assemblage illustrated in FIGURE 1 but seen from a different angle.
Figure 6:
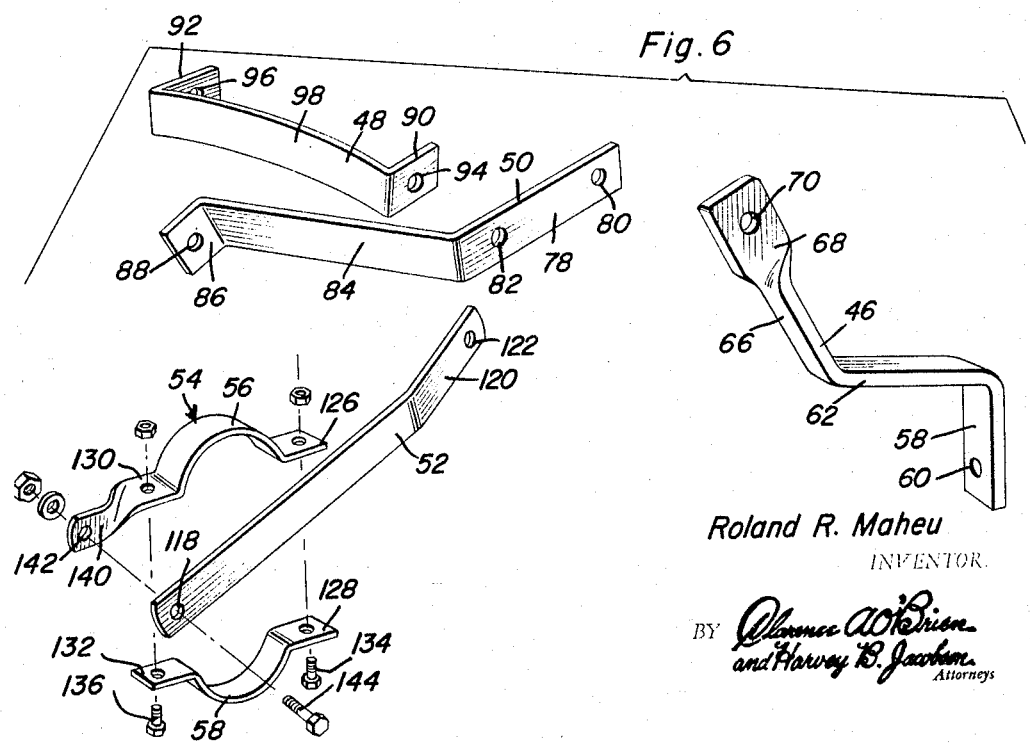
FIGURE 6 is an exploded perspective view of the mounting brackets for the alternator of the assembly of the instant invention.

In addition, the shroud 22 has a pair of spaced openings 100 formed therethrough and a plurality of threaded nuts 102 are secured to the back side of the housing 22 in alignment with the openings 100. These openings and nuts 102 are conventionally utilized to mount the ignition coil 104 on the shroud 22 by means of the generally U-shaped clamp 106 extending thereabout and including apertured laterally directed end portions 108 which are registrable with the openings 100. However, for the purpose of installing the assembly 30 of the instant invention on the engine 10, the ignition coil 104 has been relocated as illustrated in FIGURES 1 and 2 of the drawings and secured to a different portion of the shroud 22 by means of suitable metal screw fasteners 110.

The apertured leg 92 of the mounting brace 48 and the laterally directed and apertured end portion 86 of the mounting bracket 50 are secured to the old mounting location for the coil 104 by means of suitable fasteners 112 passed through the apertures 96 and 88 and threadedly engaged with the nuts 102. The short leg 78 overlies the back surface of the mounting flange 38 with the apertures 80 and 82 aligned with the threaded bores 40 and 42 and the leg 90 overlies the short leg 78 of the mounting bracket 50 with the aperture 94 aligned with the aperture 82. Suitable fasteners 114 and 116 are secured through the apertures 80, 82 and 94, respectively, and threadedly engaged with the threaded bores 40 and 42 to secure the mounting brackets 48 and 50 to the plate 36. In addition, the mounting bracket 52 may be seen to include an elongated member apertured at one end as at 118 and a slightly laterally directed end portion 120 at its other end suitably apertured as at 122. The laterally directed end portion 120 overlies the back surface of the mounting flange 38 with the aperture 122 aligned with the bore 44 and a fastener 124 is passed through the aperture 122 and threadedly engaged in the bore 104. In addition, the sections 56 and 58 of the clamp assembly 54 define two C-shaped sections including pairs of corresponding apertured ears 126 and 128 and 130 and 132 through which suitable fasteners 134 and 136, respectively, are secured for securing the clamp assembly 54 about the heater conduit or neck 24. The apertured end portion 130 includes a terminal end portion 140 which is rotated 180 degrees and apertured as at 142. The apertures 118 and 142 are registered and have a fastener 144 secured therethrough.

Accordingly, it may be seen that the mounting brackets 46 and 52 define support arms which extend generally radially outwardly from the opposite sides of the alternator case 36 and diverge downwardly for securement to the internal combustion engine 10. In addition, the mounting bracket 48 defines a support arm which extends generally normal to the plane in which the mounting brackets 46 and 52 are disposed and the mounting bracket 50 defines a support arm extending between the case 36 and the fan shroud 22 of the internal combustion engine 10 at an angle inclined generally 45 degrees relative to longitudinal and transverse vertical planes passing through the internal combustion engine in which the brackets 48 and 52, respectively, are disposed. This type of support for the alternator 32 defines an extremely rigid support and a vibrationless support for mounting the alternator 32 in an unobtrusive position on an internal combustion engine which has been designed for compactness. In addition, the mounting of the alternator 32 as illustrated and described herein does not interfere with normal periodic preventive maintenance suggested by a manufacturer of the engine 10 and accordingly, the alternator mounting assembly 30 of the instant invention provides a means for mounting a supplemental electrical system on the engine 10 that is highly desirable.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a generator including a mounting case and a rotatable input shaft journaled from said case for rotation about an axis extending between opposite ends of said case with one end of said shaft projecting outwardly of one end of said case and having a driven wheel thereon, an internal combustion engine of the type including an output shaft having a drive wheel thereon and a fan shroud spaced axially in one direction along said shaft relative to said drive wheel and including a first portion spaced laterally to one side of the axis or rotation of said output shaft and extending transversely thereof and a second portion projecting away from said first portion in the opposite direction, and a generator mounting assembly for mounting said generator in the area spaced laterally to said one side of the last-mentioned axis and disposed between parallel planes containing said drive wheel and said portions of said shroud, respectively, with the axis of rotation of said input shaft generally paralleling the axis of rotation of said output shaft and said wheels aligned with each other, said mounting assembly including a first elongated bracket secured between said case and said engine and second and third elongated brackets secured between said case and said shroud, said first bracket extending at generally right angles relative to said axes and extending between said case and said engine and generally paralleling and disposed on one side of and adjacent a plane containing said shafts adjacent said second bracket being secured to and extending between said case and said first portion of said shroud and generally paralleling said axes, and said third bracket being secured to and extending between said case and said second portion of said shroud, disposed on the side of the last-mentioned plane remote from said first bracket, and extending at generally right angles relative to said axes and said last-mentioned plane.

2. The combination of claim 1 wherein the ends of said portions of said first and second brackets secured to said case are spaced axially of the axis of rotation of said input shaft.

3. The combination of claim 1 including a fourth elongated bracket secured between said case and said first portion of said shroud and extending at generally 45° relative to the last mentioned plane and said axes.

4. The combination of claim 1 wherein said third bracket includes means operative to adjust the effective length of said third bracket, said first bracket being secured to said case for securement in adjusted rotated position relative to said case about an axis generally paralleling said axes.

References Cited by the Examiner
UNITED STATES PATENTS

| | | | |
|---|---|---|---|
| 1,758,191 | 5/1930 | Dorn | 310—91 |
| 1,968,951 | 8/1934 | McGrath. | |
| 2,068,331 | 1/1937 | Katzman. | |
| 2,097,351 | 10/1937 | Smith | 310—91 X |
| 2,603,983 | 7/1952 | Rieser. | |
| 2,856,785 | 10/1958 | Steele | 343—16 X |
| 3,129,914 | 4/1964 | Wedge | 248—16 |
| 3,154,704 | 10/1964 | Shaffer | 310—91 X |

ORIS L. RADER, *Primary Examiner.*

G. SIMMONS, *Assistant Examiner.*